US012737473B2

(12) United States Patent
Grobelny et al.

(10) Patent No.: US 12,737,473 B2
(45) Date of Patent: Sep. 15, 2026

(54) MANAGING STARTUP OF A DATA PROCESSING SYSTEM USING A STARTUP POLICY

(71) Applicant: Dell Products L.P., Round Rock, TX (US)

(72) Inventors: Nicholas D. Grobelny, Evergreen, CO (US); Amy Christine Nelson, Round Rock, TX (US); David Albert Consolver, Hurst, TX (US); Raman Sharma, Leander, TX (US); Richard M. Tonry, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 77 days.

(21) Appl. No.: 19/027,198

(22) Filed: Jan. 17, 2025

(65) Prior Publication Data

US 2026/0212019 A1 Jul. 23, 2026

(51) Int. Cl.
*G06F 21/57* (2013.01)

(52) U.S. Cl.
CPC .................................. *G06F 21/575* (2013.01)

(58) Field of Classification Search
CPC ..................................................... G06F 21/575
See application file for complete search history.

(56) References Cited

U.S. PATENT DOCUMENTS 10,708,256 B1 7/2020 Kane-Parry
11,120,136 B1 * 9/2021 BeSerra ................. G06F 21/10
11,316,891 B2 4/2022 Sbandi
11,928,639 B2 3/2024 Young et al.
12,261,966 B1 3/2025 Levy
12,393,691 B2 * 8/2025 Edwards ................. G06F 21/32
12,556,922 B1 2/2026 Richards
2006/0242405 A1 10/2006 Gupta (Continued)

OTHER PUBLICATIONS

Sanders, Ryan. (Mar. 8, 2021). “The Key to Firmware Security in Connected IoT Devices”. Keyfactor. Retrieved from <https://www.keyfactor.com/blog/firmware-security-iot-devices/> on Jan. 28, 2025 (3 pages).

(Continued)

*Primary Examiner* — Faisal M Zaman
(74) *Attorney, Agent, or Firm* — WOMBLE BOND DICKINSON (US) LLP

(57) ABSTRACT

Methods and systems for managing operation of a data processing system are disclosed. To do so, during a startup of the data processing system, a startup policy may be obtained. The startup policy may indicate that a first portion of hardware components of the data processing system may be used to evaluate a security posture of the data processing system during startup and a second portion of the hardware components may not be used to evaluate the security posture during startup. A measurement process may be performed based on a security protocol and data model (SPDM) security standard for the first portion to obtain first measurements. The security posture may be evaluated using a trusted platform module based on the first measurements. Operation of the data processing system may be managed based on the security posture to reduce a likelihood of the data processing system being compromised.

20 Claims, 8 Drawing Sheets

(56) References Cited

U.S. PATENT DOCUMENTS

2009/0080661 A1 3/2009 Brown
2010/0031028 A1 2/2010 Adams
2013/0166899 A1 6/2013 Courtney
2017/0180355 A1 6/2017 Enns
2019/0238584 A1* 8/2019 Somasundaram ...... H04L 63/20
2020/0162262 A1 5/2020 Shekh-Yusef
2020/0344265 A1 10/2020 Kelly
2020/0358623 A1 11/2020 Munzert
2021/0034733 A1* 2/2021 Grobelny ................ G06F 21/44
2021/0312044 A1 10/2021 Berger et al.
2021/0320944 A1* 10/2021 Ogle ................... H04W 12/009
2021/0367974 A1 11/2021 Ponnuru
2022/0067123 A1* 3/2022 Rafey .................. G06N 3/0442
2022/0092203 A1 3/2022 Khatri et al.
2022/0292203 A1 9/2022 Severns-Williams
2022/0329604 A1* 10/2022 Guy .................... H04L 41/0893
2022/0358220 A1* 11/2022 Smith ..................... G06F 21/53
2023/0007874 A1 1/2023 Mugunda
2023/0009968 A1 1/2023 Ramaiah
2023/0087829 A1* 3/2023 Ponnuru ................. G06F 21/44 726/17
2023/0239165 A1 7/2023 Young et al.
2023/0367860 A1 11/2023 Stewart
2024/0104215 A1 3/2024 Paulraj et al.
2024/0134996 A1 4/2024 Madala et al.
2024/0134999 A1 4/2024 Madala et al.
2024/0152620 A1 5/2024 Marando
2024/0179014 A1 5/2024 Ruan
2024/0184929 A1 6/2024 Orlando
2024/0249002 A1 7/2024 Yoon
2024/0284317 A1* 8/2024 Barton .................. H04W 48/18
2024/0296214 A1 9/2024 Bisa
2024/0296256 A1* 9/2024 Ramaiah ................. G06F 21/57
2024/0303317 A1 9/2024 Ahmed
2024/0303380 A1 9/2024 Ponnuru
2024/0303381 A1 9/2024 Ponnuru
2024/0311482 A1* 9/2024 Paulraj .................... G06F 21/44
2024/0320322 A1 9/2024 Yao
2024/0411652 A1 12/2024 Prabhakar
2024/0413982 A1 12/2024 Prabhakar
2025/0013760 A1* 1/2025 Smith ................... G06F 21/602
2025/0139305 A1 5/2025 Sahita
2025/0159016 A1* 5/2025 Hen ...................... G06F 21/577
2025/0165577 A1* 5/2025 Radhakrishnan ....... G06F 21/73
2025/0260565 A1 8/2025 Abdelsamie
2025/0265337 A1 8/2025 Kumar
2025/0267015 A1 8/2025 Yao
2026/0030358 A1 1/2026 Paulraj

OTHER PUBLICATIONS

Epp, Sergej. “Firmware Security: Watch Out for These 5 Excuses”. paloalto Networks. Retrieved from <https://www.paloaltonetworks.sg/cybersecurity-perspectives/firmware-security-watch-out-for-these-5-excuses> on Jan. 28, 2025 (2 pages).

* cited by examiner

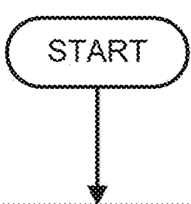

Obtain a startup policy for a data processing system, the startup policy indicating that a first portion of hardware components of the data processing system may be used to evaluate a security posture of the data processing system and a second portion of the hardware components may not be used to evaluate the security posture of the data processing system during the startup.
Operation 330

Perform, based on the startup policy and a security protocol and data model (SPDM) security standard, a first measurement process for the first portion of the hardware components to obtain first measurements.
Operation 332

Evaluate, using a trusted platform module (TPM), a security posture of the data processing system based on the first measurements and not using measurements of any of the second portion of the hardware components.
Operation 334

Manage operation of the data processing system based on the security posture to reduce a likelihood of the data processing system being compromised.
Operation 336

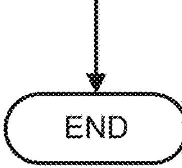

FIG. 3C

MANAGING STARTUP OF A DATA PROCESSING SYSTEM USING A STARTUP POLICY

FIELD

Embodiments disclosed herein relate generally to managing operation of a data processing system. More particularly, embodiments disclosed herein relate to systems and methods to manage startup of a data processing system using a startup policy.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIGS. 3A-3C show flow diagrams illustrating a method for managing operation of a data processing system in accordance with an embodiment.

DETAILED DESCRIPTION

Figure 1:
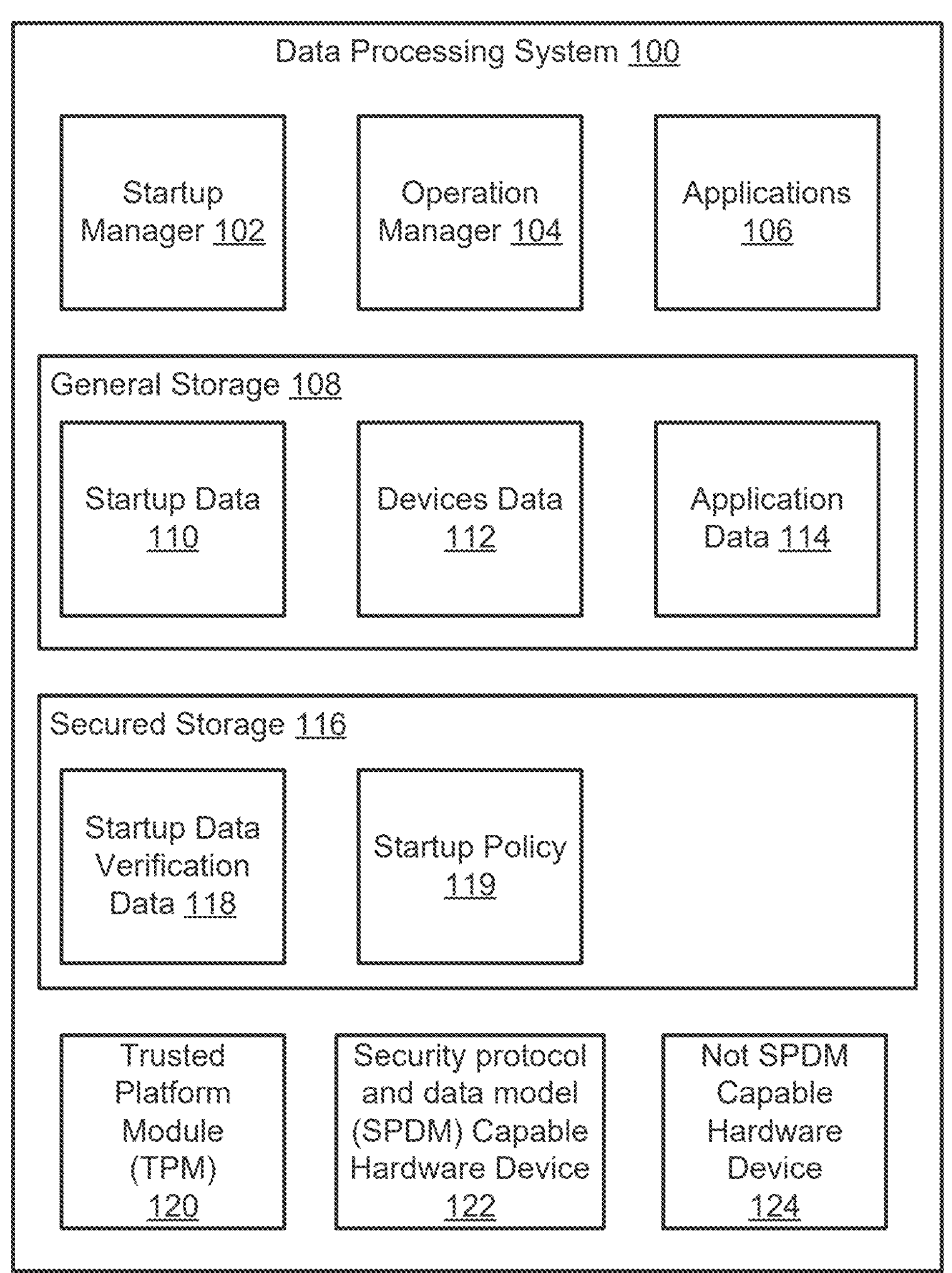
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of a data processing system. The data processing system may include hardware and/or software components that, in some combination, may be used to provide computer-implemented services. To provide the computer-implemented services, the data processing system may undergo a startup during which functionality of a portion of its hardware and/or software components may be enabled.

During the startup, a startup manager of the data processing system (e.g., a basic input/output system (BIOS)) may perform tasks such as accessing and/or verifying untrusted data structures retrieved from the hardware components (e.g., measurements). For example, during a secure boot (e.g., a type of startup) of the data processing system, the startup manager may perform security checks where integrity and/or authenticity of the hardware and/or software components is verified (e.g., secure boot verification) using the measurements. Doing so may reduce a risk of compromise of the data processing system, errors occurring during startup, etc.

To obtain the measurements, the startup manager may communicate with the hardware components using a predefined industry standard, such as the security protocol and data model (e.g., SPDM) security standard. Communicating with the hardware components using the SPDM security standard may allow the startup manager to retrieve the measurements in a manner that establishes an acceptable level of trust that the hardware components will not compromise the data processing system once booted.

The startup manager may perform the startup tasks (e.g., determining whether each of the hardware components is compliant with the SPDM security standard, obtaining the measurements from hardware components that are compliant with the SPDM security standard) in sequence. However, the startup manager may have a limited capacity to perform the startup tasks (e.g., due to its host hardware and/or program code). For example, operation of the startup manager may be limited by a single processor that executes instructions one after the other in a specific order (e.g., as in sequential processing). Since each of the startup tasks may also have some degree of time dependence, these limitations may cause bottlenecks (e.g., delays in completion of the startup). Such delays may consume an undesirable amount of computational and/or time resources, which may negatively affect the quality and/or availability of the computer-implemented services.

To improve startup speed, thereby reducing resource consumption during startup, a startup policy may be obtained by the startup manager. The startup policy may indicate that: (i) the security checks are to be performed for a first portion of the hardware components of the data processing system during the startup, and (ii) the security checks are not to be performed for a second portion of the hardware components of the data processing system during the startup.

Whether a security check is to be performed for a hardware component during the startup may be based on a level of risk to the security of the data processing system if the hardware component is compromised, a likelihood that changes have been made to the hardware component since a most recent startup of the data processing system, and/or based on other criteria.

Consequently, a security posture for the data processing system may be evaluated (e.g., via performing the security checks) during the startup using first measurements obtained from the first portion of the hardware components and not using second measurements obtained from the second portion of the hardware components.

Thus, embodiments disclosed herein may address, among other technical problems, the technical challenge of performing a startup of a data processing system in a manner that conserves resources while maintaining an acceptable level of security of the data processing system. By using a startup policy, each hardware component may not be utilized to evaluate a security posture of the data processing system during the startup. Consequently, startup time may be reduced, and computer-implemented services may be provided in a timely manner.

In an embodiment, a method for managing operation of a data processing system is disclosed. The method may include: during a startup of the data processing system: obtaining a startup policy for the data processing system, the startup policy indicating that: a first portion of hardware components of the data processing system is to be used to evaluate a security posture of the data processing system during the startup, and a second portion of the hardware components is not to be used to evaluate the security posture of the data processing system during the startup; performing, based on the startup policy and a security protocol and data model (SPDM) security standard, a first measurement process for the first portion of hardware components to obtain first measurements; evaluating, using a trusted platform module (TPM), the security posture of the data processing system based on the first measurements and not using measurements of any of the second portion of the hardware components; and managing operation of the data processing system based on the security posture to reduce a likelihood of the data processing system being compromised.

The method may also include: after the startup of the data processing system: performing a second measurement process, based on the SPDM security standard, for the second portion of the hardware components to obtain second measurements; updating the security posture of the data processing system based on the second measurements to obtain an updated security posture for the data processing system; and managing the operation of the data processing system based on the updated security posture to reduce the likelihood of the data processing system being compromised.

Hardware components of the first portion of the hardware components and hardware components of the second portion of the hardware components may be compliant with the SPDM security standard.

Second measurements may be available to be obtained from the second portion of the hardware components at a time that the first measurement process is performed.

Members of the first portion of the hardware components and members of the second portion of the hardware components may be chosen based on levels of risk to security of the data processing system corresponding to potential compromise of each of the hardware components of the data processing system.

The members of the first portion of the hardware components may pose a greater risk to the security of the data processing system if compromised than the members of the second portion of the hardware components.

Members of the first portion of the hardware components and members of the second portion of the hardware components may be chosen based on likelihoods that changes have been made to each of the hardware components of the data processing system since a previous startup of the data processing system occurred.

The startup policy and a list of hardware components of the data processing system that are compliant with a security protocol and data model (SPDM) security standard may be obtained by a startup manager of the data processing system prior to performing the first measurement process.

The startup manager may be a basic input-output system (BIOS).

The startup manager may be hosted by a hardware processor of the data processing system, and the trusted platform module may be a hardware component that is distinguishable from the hardware processor.

The first measurements may include first security data usable to validate authenticity and/or integrity of software hosted by the first portion of the hardware components.

The SPDM security standard may be a data model for hardware components of data processing systems, the SPDM security standard specifying, at least, methods of security communication between the hardware components, minimum standards of data to be made available to other hardware components, and security information to be made available to the other hardware components.

Managing the operation of the data processing system may include: limiting, by the TPM, use of secrets by the data processing system based on the security posture of the data processing system.

Evaluating the security posture of the data processing system may include: checking integrity and/or authenticity of software hosted by the first portion of the hardware components using the first measurements and data structures trusted by the TPM.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer-implemented services may include, for example, database services, data processing services, communication services, and/or any other services that may be provided using one or more computing devices. Other types of computer-implemented services may be provided by the system without departing from embodiments disclosed herein.

To provide the computer-implemented services, the system (e.g., a data processing system) may undergo a startup during which functionality of a portion of its hardware and/or software components may be enabled. For example, the computer-implemented services may require access to processors, memory modules, storage devices, communication devices, and/or other devices operably connected to the data processing system. The hardware components may support execution of any number and/or type of software components (e.g., applications), and, in some combination, the hardware and software components may provide for various types of computer-implemented services.

To perform the startup, a startup manager of the data processing system (e.g., a basic input/output system (BIOS)) may access, verify, and use data stored by the data processing system and/or retrieved from the hardware components (e.g., startup data). The startup data may include instructions corresponding to software usable to facilitate various tasks of the startup (e.g., tasks for performing device verification and initialization, and/or other tasks related to enabling and/or securing hardware functionality), and/or data structures usable to verify the integrity and/or authenticity of the software hosted by the hardware components (e.g., firmware).

For example, during a secure boot (e.g., a type of startup) of the data processing system, the tasks may include security checks where integrity of portions of the startup data are validated (e.g., secure boot verification). The secure boot verification may be performed (e.g., using startup data verification data stored by the data processing system, using a security manager such as a trusted platform module (TPM)) in order to establish trust in each portion of the startup data before use (e.g., execution), so that exposure to malicious or erroneous software is unlikely. Doing so may reduce a risk of compromise of the data processing system, errors occurring during startup, etc.

The tasks associated with the startup may be performed by the startup manager in sequence throughout the startup process. By performing the tasks associated with the startup in sequence, the risk of compromise of the data processing system may be further reduced.

To perform the tasks associated with the startup, the startup manager may communicate with the hardware components (e.g., devices) using a predefined industry standard, such as the security protocol and data model (e.g., SPDM) security standard. Communicating with the devices using the SPDM security standard may allow the startup manager to retrieve data structures from the devices usable to verify the integrity and/or authenticity of the software hosted by the devices in a manner that establishes an acceptable level of trust that the devices will not compromise the data processing system once booted.

The tasks associated with the startup (e.g., determining which hardware components of the data processing system are compliant with the SPDM security standard, attempting to obtain startup data from each hardware component that is compliant with the SPDM security standard) may be performed in sequence by the startup manager. However, the startup manager may have a limited capacity to perform the tasks (e.g., due to its host hardware and/or program code). For example, operation of the startup manager may be limited by a single processor that executes instructions one after the other in a specific order (e.g., as in sequential processing). Since each of the startup tasks may also have some degree of time dependence, these limitations may cause bottlenecks (e.g., delays in completion of the startup process). Such delays may consume an undesirable amount of computational and/or time resources, which may negatively affect the quality and/or availability of the computer-implemented services.

In general, embodiments disclosed herein may provide methods, systems, and/or devices for managing startup of a data processing system in a manner that improves startup speed. To do so, security checks may only be performed for a first portion of the hardware components of the data processing system during startup based on a startup policy for the data processing system. The startup policy may be generated by a subject matter expert (SME) (e.g., an administrator) and may indicate that: (i) security checks are to be performed for the first portion of the hardware resources during the startup and (ii) security checks are not to be performed for a second portion of the hardware resources during the startup.

The first portion of the hardware components may be compliant with the SPDM security standard and may be selected based on any criteria. The second portion of the hardware components may also be compliant with the SPDM security standard and startup data may be available from the second portion of the hardware components at a time the security checks are performed for the first portion of the hardware components. Consequently, the startup manager may elect not to perform security checks for the second portion of the hardware components based on the startup policy.

By doing so, embodiments disclosed herein may conserve computational and time resources during startup of a data processing system. By referencing a startup policy, validity and/or authenticity of startup data for each hardware component of the data processing system may not be required to be validated during the startup. By reducing the number of hardware components for which security checks are performed during the startup, startup time may be reduced while maintaining an acceptable level of security during a boot process. Consequently, the computer-implemented services may be provided in a timely manner while reducing computational resources consumed.

To provide the above noted functionality, the system of FIG. 1 may include data processing system 100, startup manager 102, operation manager 104, applications 106, general storage 108, secured storage 116, trusted platform module (TPM) 120, security protocol and data model (SPDM) capable hardware device 122, and not SPDM capable hardware device 124. Each of these components is discussed below.

Data processing system 100 may include any number of hardware components (e.g., processors, memory modules, storage devices, communications chips, other devices). The hardware components may support execution of any number and/or type of software components (e.g., startup manager 102, operation manager 104, applications 106, etc.).

Data processing system 100 may provide any number and type of computer-implemented services. To provide the computer-implemented services, data processing system 100 may include startup manager 102. Startup manager 102 may include a startup management entity (e.g., a basic input/output system (BIOS)) hosted by a hardware processor of data processing system 100 and may facilitate management of startup of data processing system 100 from power on to booting to operation manager 104. The startup of data processing system 100 may include performing a secure boot procedure. During the secure boot procedure, startup manager 102 may perform tasks related to device verification and initialization, and/or other tasks related to enabling and/or securing hardware functionality.

To perform its functionality, startup manager 102 may: (i) perform device enumeration tasks to obtain a list of devices (e.g., hardware components) operably connected to data processing system 100 (e.g., including obtaining identifiers for the devices such as globally unique identifiers (GUIDs)), (ii) use devices data 112 to determine whether any of the devices are new devices (e.g., devices that have been added to data processing system 100 since last completed startup), (iii) obtain security protocol and data model (SPDM) capabilities for the new devices (e.g., query the new devices for SPDM capabilities), (iv) update devices data 112 to include the SPDM capabilities of the new devices, (v) obtain a startup policy (e.g., startup policy 119) for data processing system 100, (vi) perform a first measurement process to obtain first measurements following the SPDM security standard for a first portion of hardware components (e.g., devices) with SPDM capabilities that are specified by startup policy 119 (e.g., as part of startup data 110), (vii) provide the first measurements to a trusted platform module (TPM) of data processing system 100 as part of performing verification processes to verify the integrity and/or authenticity of the first portion of the hardware components (e.g., using startup data verification data 118), (viii) boot to operation manager 104, restrict capabilities of operation manager 104, and/or prevent booting to operation manager 104 based on an outcome of the verification processes, and/or (ix) perform other tasks.

The devices operably connected to data processing system 100 may be compliant with the SPDM security protocol (e.g., SPDM capable hardware device 122) or may not be compliant with the SPDM security protocol (e.g., not SPDM capable hardware device 124). SPDM capable hardware device 122 may include a device with SPDM capabilities. For example, SPDM capable hardware device 122 may be designed to comply with the SPDM security standard managed by the Distributed Management Task Force (DMTF). Complying with the SPDM security standard may allow the device to have its identity authenticated and its integrity verified in a manner that allows startup manager 102 to have an acceptable level of trust that the device is not compromised and/or malicious. Not SPDM capable hardware device 124 may be unable to have its identity authenticated and/or its integrity verified in the manner that allows startup manager 102 to have the acceptable level of trust. Thus, not SPDM capable hardware device 124 may be prevented from booting and/or may have a portion of its functionality restricted during operation of data processing system 100 (or at least until subsequent verification procedures are performed).

While described with respect to determining whether a device is compliant with the SPDM security protocol managed by the DMTF, it will be appreciated that device compliance with any other security standard may be determined in a similar manner without departing from embodiments disclosed herein.

To determine whether a device is a new device (e.g., with unknown SPDM capabilities), devices data 112 may be used by startup manager 102. Devices data 112 may include an existing list (and/or may be implemented using, for example, tables, unstructured data, trees, databases, etc.) for which startup manager 102 has previously obtained information regarding SPDM capabilities. For example, devices data 112 may include an identifier for a device, and an indication corresponding to the identifier regarding whether the device is compliant with the SPDM security standard.

Devices data 112 may be stored in general storage 108 and may be used by startup manager 102 to determine whether any of the devices are new devices. For example, startup manager 102 may obtain an identifier for a graphics processing unit (GPU) during device enumeration. Startup manager 102 may perform a lookup process in a table of devices and corresponding SPDM capabilities included in devices data 112 using the identifier as a key for the lookup process. If startup manager 102 determines that the GPU is a new device (e.g., no entries in the table of devices correspond to the identifier), startup manager 102 may proceed to obtain the SPDM capabilities of the GPU.

The SPDM capabilities for a new device may be obtained by checking the firmware and/or system documentation of the new device to determine whether the new device supports the SPDM security standard. A dedicated tool and/or command may be used to query the new device for its specific SPDM capabilities, including supported cryptographic algorithms and/or certificate formats (e.g., via an SPDM message exchange with the new device to retrieve its identity certificate and/or associated details about its security features). Any information obtained from the new device while obtaining the SPDM capabilities of the new device may be added to devices data 112 and used during subsequent startups of data processing system 100.

Startup policy 119 may include a rule set indicating that: (i) a first portion of hardware components (e.g., devices) of data processing system 100 are to be used to evaluate a security posture of data processing system 100 during startup and (ii) a second portion of the hardware components of data processing system 100 are not to be used to evaluate the security posture of data processing system 100 during the startup. Evaluating the security posture of the data processing system during the startup may include operations similar to those described with respect to performing security checks for devices (e.g., obtaining startup data, using TPM 120 to verify integrity and/or authenticity of software hosted by the devices using the startup data and data structures trusted by TPM 120). Consequently, security checks may be performed for the first portion of the hardware components and may not be performed for the second portion of the hardware components during the startup.

Startup policy 119 may be generated by an SME (e.g., an administrator) and may include a cryptographically verifiable data structure signed using a private key of a public private key pair maintained by the administrator. By doing so, other entities may verify (e.g., using a corresponding public key of the public private key pair) that startup policy 119 was generated by a trusted entity. Members (e.g., hardware components) of the first portion of the hardware components and members of the second portion of the hardware components may be selected based on any criteria.

For example, the members of the first portion of the hardware components and the members of the second portion of the hardware components may be chosen based on levels of risk to security of the data processing system corresponding to potential compromise of each of the hardware components of data processing system 100. The levels of risk may be assigned to each of the hardware components using any method (e.g., by an SME, by an inference model) and may be based on an extent to which compromise of each hardware component may impact the operation of data processing system 100. The levels of risk may then be compared to a level of risk threshold and/or may be evaluated using any other method. For example, hardware components with levels of risk that exceed the level of risk threshold may be added to the first portion of the hardware components and any hardware components with levels of risk that fall below the level of risk threshold may be added to the second portion of the hardware components.

Compromise by a malicious entity of a first hardware component (e.g., a storage controller for a storage system) may be determined to pose a greater security risk than a second hardware component (e.g., a special purpose graphics card). The first hardware component may pose the greater security risk if compromised due to: (i) a number of other hardware and/or software components to which the first hardware component has access, (ii) types of the other hardware and/or software components to which the first hardware component has access and/or (iii) other criteria. The storage controller, for example, may have authority to access and modify general storage for the data processing system. Modification of the general storage and/or data stored in the general storage may negatively impact the operation of the data processing system (e.g., users of the data processing system may not be able to access data stored in the general storage, the users may access false data from the general storage, software components of the data processing system may be unable to access necessary data from general storage to perform desired functionalities). In contrast, the special purpose graphics card may not have authority to modify any hardware and/or software components of the data processing system.

Consequently, the first hardware component may be assigned a higher level of risk than the second hardware component. The level of risk assigned to the first hardware component may exceed the level of risk threshold and, therefore, the first hardware component may be added to the first portion of the hardware components. The level of risk assigned to the second hardware component may fall below the level of risk threshold and, therefore, the second hardware component may be added to the second portion of the hardware components. Consequently, the SME may elect to allocate the limited computing resources available during the startup to validating integrity of software hosted by the storage controller over validating integrity of software hosted by the special purpose graphics card.

While described with respect to assigning levels of risk and comparing the levels of risk to a level of risk threshold, hardware components may be assigned to the first potion or the second portion via other methods (e.g., manually by the SME without using quantitative methods) without departing from embodiments disclosed herein.

In addition, the members of the first portion of the hardware components and the members of the second portion of the hardware components may be chosen based on a likelihood that changes have been made to each of the hardware components of the data processing system since a previous startup of the data processing system occurred. For example, the members of the second portion of the hardware components may be regulated (e.g., based on any policy) to prevent changes being made (e.g., changes may only be made by certain individuals and/or under certain circumstances using a high level of cryptographic security). Hardware components that are unlikely to be modified, therefore, may be less likely to be compromised during any startup for the data processing system. Consequently, the limited computing resources available during startup may be allocated to validating components of data processing system 100 with a higher likelihood of being modified since a previous startup occurred.

Startup policy 119 may also indicate that security checks are to be performed for the second portion of the hardware components after the startup or may not require any security checks to be performed for the second portion of the hardware components. Following startup (e.g., when data processing system 100 is in a post-boot environment, refer to FIG. 2A), computational resources may be available to perform the additional security checks without negatively impacting the operation of the data processing system (e.g., processes may no longer need to be performed in sequence, desired functionality of hardware and/or software components may be available to users while the additional security checks are being performed). Therefore, the security checks for the second portion of the hardware components may be performed after the startup. The security checks for the second portion of the hardware components may be cooperatively performed by operation manager 104, using TPM 120 and/or by a remote server. Refer to server devices verification process 220 in FIG. 2A for additional details regarding this process.

Startup policy 119 may be stored in secured storage 116. Secured storage 116 may include a hardware storage device for storing data. For example, secured storage 116 may be implemented with a solid state storage device operably connected via a serial peripheral interface (SPI) bus to a processor of data processing system 100. Access to secured storage 116 may be restricted to certain entities and/or for certain uses. For example, secured storage 116 may only be accessible by startup manager 102 and/or TPM 120 for performing tasks during and/or related to startup. The contents of secured storage 116 may be generally inaccessible without providing various credentials such as passwords.

While described with respect to startup policy 119 being stored in secured storage 116, startup policy 119 may be stored in other storage architectures (e.g., general storage 108), may not be stored locally and may be stored by a remote entity (e.g., a remote server), and/or may be obtained from any other data source trusted by startup manager 102 and from which startup manager 102 may obtain startup policy 119 during the startup of data processing system 100.

Startup manager 102 may identify a list of devices that are: (i) compliant with the SPDM security standard and (ii) designated for startup security checks by the startup policy (e.g., the first portion of the hardware components). The first portion of the hardware components may include, for example, SPDM capable hardware device 122. For each hardware component (e.g., device) of the first portion of the hardware components, startup manager 102 may obtain measurements (e.g., startup data 110) from the device following the SPDM security standard. Startup data 110 may include data structures obtained from the devices that are usable to verify the integrity and/or authenticity of the software hosted by the devices (e.g., during a secure boot verification process). The data structures may include cryptographic hashes, digital fingerprints, and/or other data structures that indicate the current state of a device's firmware, configuration, and/or other characteristics of the components. Startup manager 102 may provide startup data 110 to trusted platform module (TPM) 120.

TPM 120 may be a hardware component that is distinguishable from the hardware processor that hosts startup manager 102 and may provide security management services for data processing system 100 (e.g., may comply with ISO/IEC 11889:2009, any of the TPM main specification such as Version 2.0, and/or may conform operation to other industry standards). To provide the security management services, TPM 120 may (e.g., in collaboration with startup manager 102) (i) facilitate verification of startup data 110 using startup data verification data 118 to establish trust in each portion of startup data 110 before use (e.g., execution), so that exposure to malicious or erroneous software is unlikely (e.g., is not executed), (ii) store and restrict use of secrets (e.g., public/private keys, etc.) based on security posture of data processing system 100, and (iii) facilitate the identification of (e.g., in collaboration with software components of the data processing system such as startup manager 102) the security posture of data processing system 100 based on measurements of various components (e.g., firmware hosted by various devices (e.g., 122, 124), software loaded into data processing system 100, hardware/software component presence/absence, etc.) of data processing system 100. Startup data verification data 118 may include secure boot data usable to verify the integrity and trust in startup data 110 (e.g., various portions of startup data 110) prior to use of (the various portions of) startup data 110. For example, startup data verification data 118 may include hashes and/or other types of information usable to cryptographically verify trust and integrity of startup data 110. TPM 120 may include data (e.g., a hash, a signature, etc.) usable to verify integrity of startup data verification data 118. Startup data verification data 118 may be stored in secured storage 116.

Once the device measurements have been provided to TPM 120 (e.g., and presuming data processing system 100 has been determined to be in a predetermined state using, at least in part, TPM 120), startup manager 102 may hand off management of the operation of data processing system 100 to operation manager 104. Operation manager 104 may include, for example, an operating system, drivers, and/or other entities through which applications 106 may provide all, or a portion of, their functionality. Operation manager 104 may be booted to using startup data 110. Thus, if startup data 110 includes malicious code, undesired code, unauthorized code, etc., then operation manager 104 may operate in a manner that diverges from a desired manner. To reduce this possibility, as discussed above, startup manager 102 may perform various actions to improve a likelihood that data processing system 100 operates in a predetermined (e.g., desired) manner.

For example, if startup policy 119 (and/or another policy) indicates that security checks are to be performed for the second portion of the hardware components after the startup of the data processing system, operation manager 104 may manage these security checks in the post-boot environment of data processing system 100 (e.g., based on secrets maintained by TPM 120, based on secrets maintained by a remote server). Operation manager 104 may obtain startup data from the second portion of the hardware components (e.g., second measurements) based on the SPDM security standard and may interact with TPM 120 to validate integrity and/or authenticity of the second measurements. Performing the security checks for the second portion of the hardware components may include methods similar to those described with respect to server devices verification process 220 in FIG. 2A and/or via other methods without departing from embodiments disclosed herein.

Applications 106 may include any type and quantity of applications (e.g., software components) that may provide any type and quantity of computer-implemented services. To do so, applications 106 may generate, store, modify, read, and/or otherwise use application data 114 stored in general storage 108.

General storage 108 may be implemented using physical devices that provide data storage services (e.g., storing data and providing copies of previously stored data). The devices that provide data storage services may include hardware devices and/or logical devices. For example, general storage 108 may include any quantity and/or combination of memory devices (e.g., volatile storage), long term storage devices (e.g., persistent storage), other types of hardware devices that may provide short term and/or long term data storage services, and/or logical storage devices (e.g., virtual persistent storage/virtual volatile storage). General storage 108 may be accessible. For example, operation manager 104 may manage and provide access to data stored in general storage 108.

When providing their functionalities, applications 106 may utilize the functionality of operation manager 104 (e.g., to access computing resources such as processor cycles, transitory storage space, etc.). Thus, if operation manager 104 does not operate in the predetermined manner, then applications 106 may also operate in a manner that diverges from a desired and/or expected manner. The divergence of applications 106 and/or operation manager 104 may cause data processing system 100 to not provide (or provide in a compromised manner) all, or a portion, of the computer-implemented services that are to be provided by data processing system 100.

When providing their functionality, any components of data processing system 100 may perform all, or a portion, of the actions and methods illustrated in FIGS. 2A-3C.

Data processing system 100 (and/or components thereof) may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to the discussion of FIG. 4.

While illustrated in FIG. 1 as including a limited number of specific components, a system in accordance with an embodiment may include fewer, additional, and/or different components than those illustrated therein.

Figure 2A:
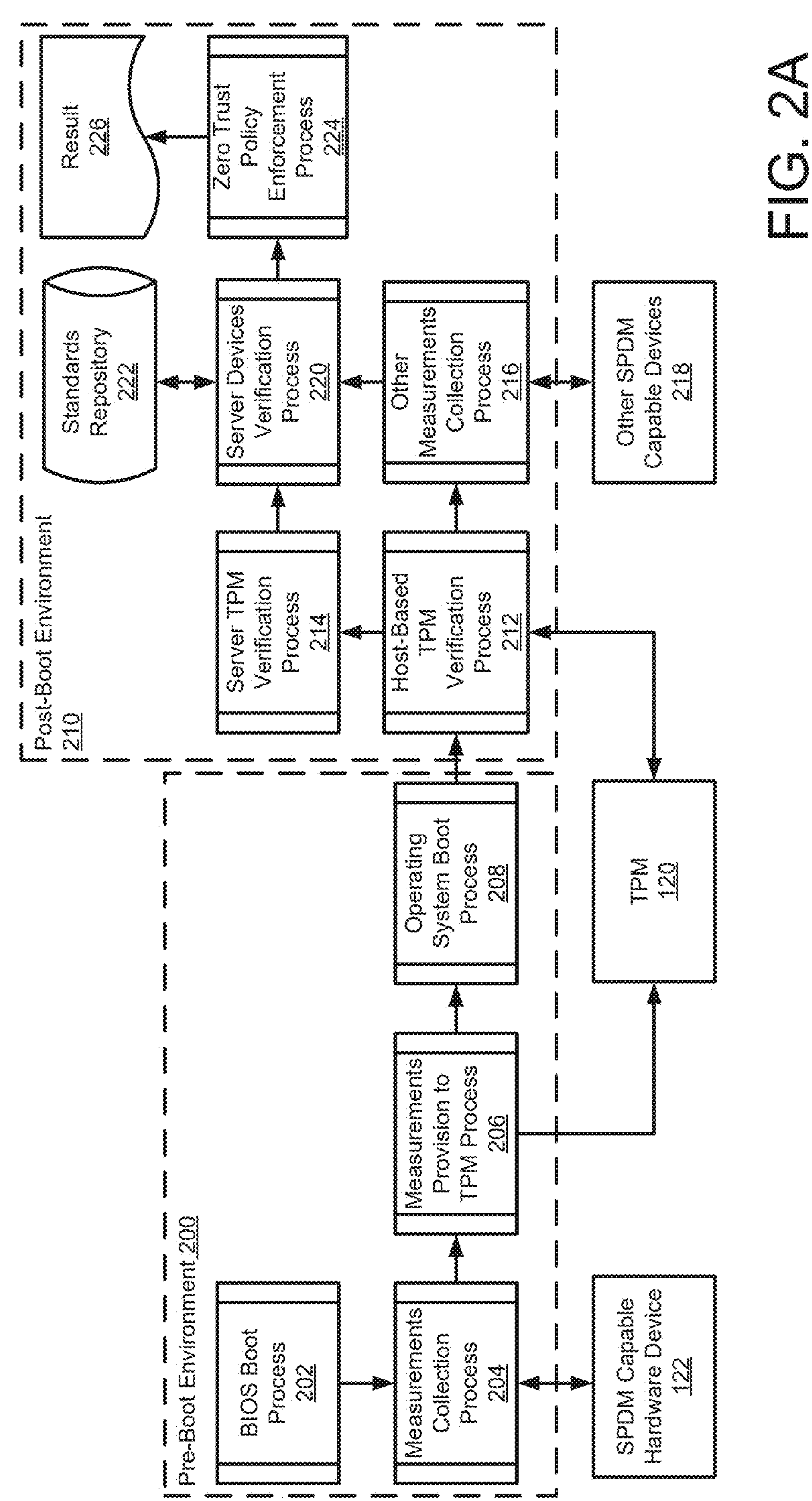
FIGS. 2A-2C show diagrams illustrating data flows in accordance with an embodiment.
Figure 2B:
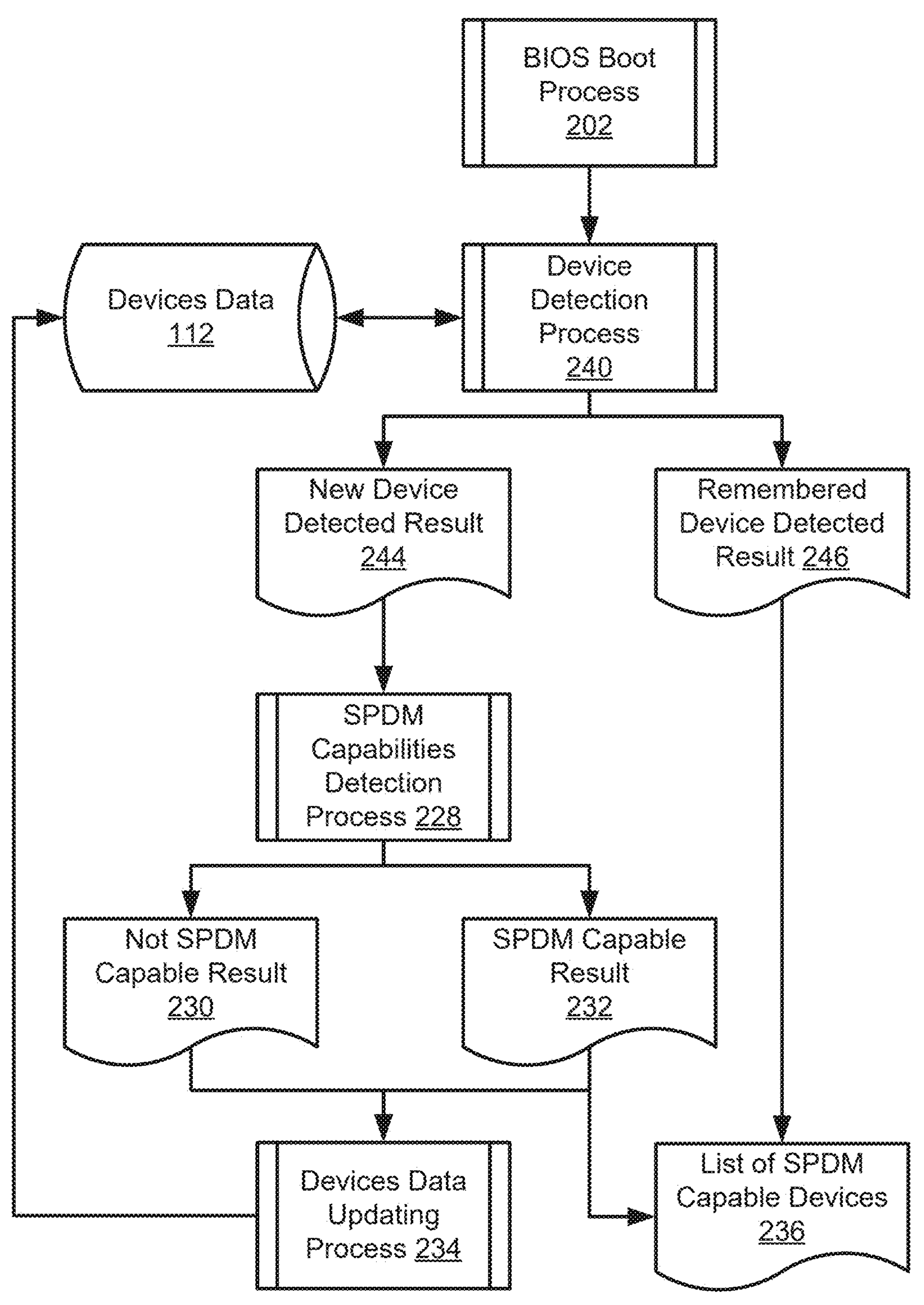
Figure 2C:
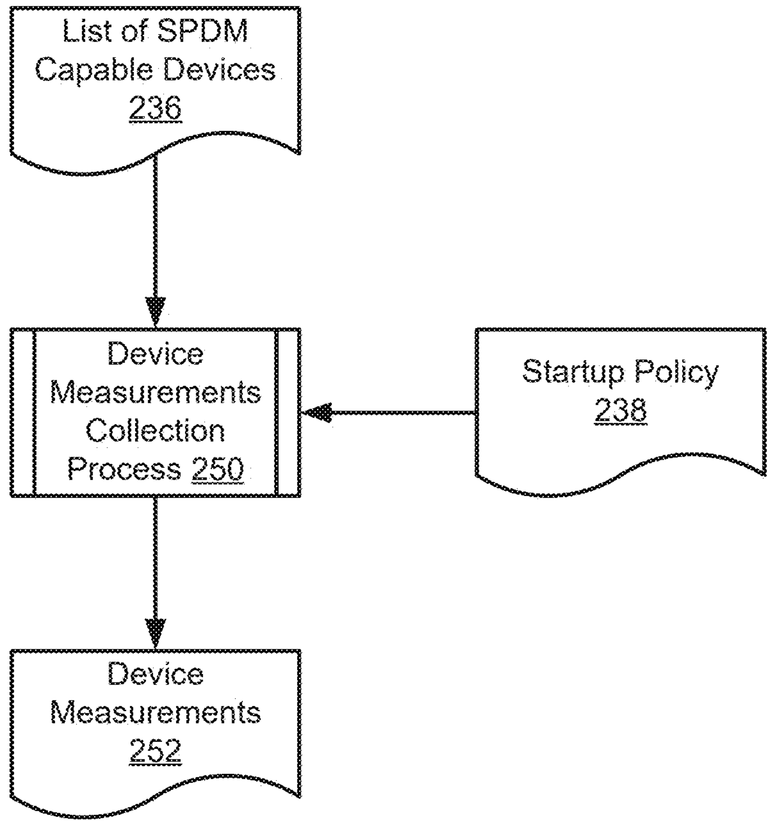

To further clarify embodiments disclosed herein, data flow diagrams in accordance with an embodiment are shown in FIGS. 2A-2C. In these diagrams, flows of data and processing of data are illustrated using different sets of shapes. A first set of shapes (e.g., 226, 244, etc.) is used to represent data structures, a second set of shapes (e.g., 202, 204, etc.) is used to represent processes performed using and/or that generate data, a third set of shapes (e.g., 222, 112, etc.) is used to represent large scale data structures such as databases, and a fourth set of shapes (e.g., 122, 120, etc.) is used to represent hardware components and/or devices.

Turning to FIG. 2A, a first data flow diagram in accordance with an embodiment is shown. The first data flow diagram may illustrate data used in and data processing performed in managing operation of a data processing system (e.g., similar to data processing system 100 shown in FIG. 1) in a manner that improves a likelihood that the data processing system operates as desired.

To manage operation of the data processing system, generally, a startup process may be performed. The startup process may cause the environment of the data processing system to evolve over time from a pre-boot environment (e.g., 200) to a post-boot environment (e.g., 210) where the data processing system may be in condition to provide desired computer-implemented services. Generally, pre-boot environment 200 refers to the state of the data processing system prior to handing off management to a general management entity, and post-boot environment 210 refers to the state of the data processing system after handing off management to the general management entity (e.g., an operating system). During the startup, various processes may be performed, as will be discussed below, to place the data processing system into a desired security posture where it is less susceptible to malicious attacks.

To begin the startup, basic input/output system (BIOS) boot process 202 (or other types of boot processes, such as to unified extensible firmware based entities, it should be appreciated that BIOS boot process 202 refers to any such processes) may be performed. BIOS boot process 202 may be initiated by powering on the data processing system or resetting the system. During BIOS boot process 202, the BIOS program code may be loaded by a processor (e.g., via a serial peripheral interface (SPI) bus and from a protected storage such as secured storage 116). The BIOS may perform tasks related to startup management for the data processing system during pre-boot environment 200 (e.g., similar to startup manager 102 shown in FIG. 1). For example, the BIOS may perform a secure boot procedure to check program code (e.g., firmware) of various hardware and/or software components (e.g., drivers) in a predefined sequence. Pre-boot environment 200 may include operations performed (e.g., by the BIOS) to hand off management of the data processing system to an operation manager (e.g., an operating system) of the data processing system.

Once the BIOS has been booted, measurements collection process 204 may be performed. During measurements collection process 204, security data (e.g., various untrusted data structures, may also be referred to as measurements) may be collected from the hardware and/or software components of the data processing system. The security data may be usable to verify the authenticity and/or integrity of software hosted by the hardware components using trusted data structures. The measurements may include data structures including cryptographic hashes or digital fingerprints that represent the current state of a device's firmware, configuration, drivers, management entity code, and/or other components that may be modified in undesired manners.

For example, the BIOS may perform measurements collection process 204 based on a security protocol and data model (SPDM) security standard. The SPDM security standard may be a data model for hardware components/devices of data processing systems, which may specify, at least: (i) methods of security communication between the hardware components, (ii) minimum standards of data to be made available to other hardware components, (iii) security information to be made available to the other hardware components, and/or (iv) other information. When performing measurements collection process 204, a list of hardware components of the data processing system that are compliant with the SPDM security standard may be obtained. The list of hardware components may be obtained using: (i) an existing list of hardware components that are compliant with the SPDM security standard, and (ii) any new hardware components of the data processing system that are not identified in the existing list.

To collect the measurements from the hardware components, the hardware components may be required to be compliant with the SPDM security standard (e.g., SPDM capable hardware device 122). Compliance with the SPDM security standard may allow the measurements to be collected in a format, using communication protocols, and/or including information specified by the SPDM security standard (e.g., managed by the Distributed Management Task Force (DMTF)). The measurements may be usable to establish an acceptable level of trust that the hardware components will not act maliciously towards the data processing system. For additional details regarding measurements collection process 204, refer to FIGS. 2B-2C.

A startup policy (not shown) may be obtained and used to determine devices from which measurements are to be obtained during measurement collection process 204 (e.g., measurements may not be obtained from one or more hardware components that are compliant with the SPDM security standard during measurement collection process 204). Refer to FIG. 2C for additional details regarding use of the startup policy.

The measurements collected from the hardware components during measurements collection process 204 may be used to perform measurements provision to trusted platform module (TPM) process 206. During measurements provision to TPM process 206, the BIOS may provide the measurements to the TPM of the data processing system (e.g., TPM 120). TPM 120 may include (and/or may be included as part of) a secure hardware component (e.g., a chip) with physical security mechanisms that reduce a likelihood of malicious and/or erroneous software compromising the data processing system (e.g., by verifying the authenticity and/or integrity of software hosted by various hardware components). The measurements may be provided to TPM 120 following a set of specifications and/or standards such as the Trusted Computing Group PC Client Platform Firmware Profile (TCP PFP). TPM 120 (e.g., reports generated by TPM 120) may then be used to compute a security posture of the data processing system (e.g., in collaboration with startup manager 102). Based on the security posture determined, at least in part, using TPM 120, booting may be allowed to proceed, some functions of the data processing system may be limited, and/or other remedial actions may be performed should the security posture not meet certain requirements (e.g., activity facilitated by the TPM may be policy driven, with the policies being keyed to the security posture of the data processing system as calculated using the TPM). Refer to the description of FIG. 1 for additional details regarding TPM 120.

Once the measurements have been provided to TPM 120 (e.g., and presuming that the measurements indicate an acceptable security posture), operating system boot process 208 may be performed. During operating system boot process 208, program code for an operating system and/or other type of operational management entity (e.g., operation manager 104 shown in FIG. 1) may be loaded onto the processor and booted so that management of the operation of the data processing system may be handed off from the BIOS to the operating system. After the handoff, the BIOS may shut down, be placed in standby, etc. Management may be handed off to the operating system to place the data processing system into a predetermined manner of operation (e.g., a manner of operation that supports execution of applications). The operating system may, for example, provide abstracted access to resources utilized by the applications, manage data storage and data retrieval, and/or perform other actions that allow for the applications that provide (all or a portion of) the computer-implemented services to execute on the data processing system.

Booting the operating system may indicate a transition from pre-boot environment 200 to post-boot environment 210. Post-boot environment 210 may include operations performed (e.g., by a management entity of the data processing system such as the operating system) to manage operation of the data processing system based on a security posture of the data processing system (e.g., established using TPM 120).

Once the operating system is booted, host-based TPM verification process 212 may be performed (e.g., a host-based verification process may be performed using the TPM of the data processing system). During host-based TPM verification process 212, TPM 120 may perform tasks related to security management of the data processing system. To do so, the measurements obtained from the BIOS may be used to perform security verification processes of the hardware and/or software components using TPM 120. For example, reports generated by TPM 120 may be used to verify the authenticity and/or integrity of untrusted data structures (e.g., the measurements) using trusted data structures, such as trusted hashes, and security programs such as a signature verification algorithm. The trusted data structures may be established during manufacturing of the data processing system and may be stored in TPM 120 and/or may be obtained by TPM 120 from trusted data sources (e.g., a unified extensible firmware (UEFI) signature database).

Host-based TPM verification process 212 may establish a security posture of the data processing system. The security posture may be based on a result of the security verification processes performed using TPM 120. For example, if, using reports generated by TPM 120, the authenticity and/or integrity of all and/or a portion of the hardware components is unable to be verified (e.g., the security posture includes indications of compromise), actions may be performed to reduce the likelihood of compromise of the data processing system. The actions may include limiting use of secrets managed by TPM 120 by the data processing system (e.g., the operating system) based on the security posture of the data processing system and/or performing other actions. The actions performed using TPM 120 may result in limited and/or reduced functionality of the operating system.

If at least one hardware component is unable to be verified using TPM 120 (e.g., using reports generated by TPM 120 trust is unable to be established in software hosted by the at least one hardware component), the measurements obtained from the at least one hardware component may be provided to a remote entity (e.g., a server and/or any other management system for the data processing system). The measurements collected from the at least one hardware component may be used to perform server TPM verification process 214. During server TPM verification process 214, the remote entity may perform tasks related to verifying the integrity and/or authenticity of the at least one hardware component. To do so, the remote entity may use a data structure including expected integrity measurements of the at least one hardware component's software (e.g., a Trusted Computing Group (TCG) system refence integrity manifest). The remote entity may provide a response to the operating system indicating whether the at least one hardware component is verified.

To reduce the amount of time to complete booting of the data processing system, some devices (e.g., not necessary to boot the data processing system, with a low level of risk to the security of the data processing system if compromised, with a low chance of having been changed since a previous startup occurred) may not be verified until after operation of the data processing system is handed off to the operating system (e.g., based on the startup policy, refer to FIG. 2C). To verify those devices, other measurements collection process 216 may be performed. During other measurements collection process 216, measurements usable to verify the authenticity and/or integrity of software hosted by the devices (e.g., other SPDM capable devices 218) may be obtained (e.g., by the operating system). Other SPDM capable devices 218 may include the second portion of devices indicated by the startup policy (e.g., refer to FIG. 2C). The measurements may be obtained based on an SPDM security standard and other SPDM capable devices 218 may be compliant with the SPDM security standard.

To verify the measurements obtained from other SPDM capable devices 218, server devices verification process 220 may be performed. During server devices verification process 220, the measurements may be provided to a remote system (e.g., a server and/or other backend system) and used to perform the device verification processes remotely. To perform the device verification processes, the remote system may use trusted data structures stored in standards repository 222 to verify the untrusted data structures (e.g., the measurements). Standards repository 222 may include a database of trusted integrity measurements (e.g., a TCG component reference integrity manifest) which may be used to establish trust in the measurements from each device of other SPDM capable devices 218.

The measurements obtained from other SPDM capable devices 218 may be verified via other methods (e.g., via interactions with TPM 120) without departing from embodiments disclosed herein. The security posture of the data processing system (e.g., established during host-based TPM verification process 212) may be updated based on a result of the verification of the measurements from other SPDM capable devices 218 to obtain an updated security posture for the data processing system.

An outcome of any of the device verification processes performed by components of the data processing system and/or remote entities may be used to perform zero trust policy enforcement process 224. The outcome may include an indication of whether any of the hardware components are unable to be verified (e.g., whether trust in any of the hardware components is unable to be established). During zero trust policy enforcement process 224, remedial measures may be performed (e.g., by the operating system) if the outcome indicates a hardware component is unable to be verified. The remedial measures may be based on a predetermined zero trust policy that may reduce a likelihood of compromise and/or other undesired impacts on the data processing system. For example, the zero trust policy may include: (i) preventing the hardware component that is unable to be verified from booting, (ii) shutting down the data processing system, (iii) providing a notification to a user of the data processing system indicating the hardware component is unable to be verified, (iv) obtaining user input regarding any actions that are to be performed as a result of the hardware component being unable to be verified, and/or (v) other remedial measures.

As a result of performing zero trust policy enforcement process 224, result 226 may be obtained. Result 226 may include instructions for the operating system and/or any other management entity of the data processing system to perform various remedial measures based on the zero trust policy. Based on result 226, the operating system may manage operation of the data processing system.

Thus, by implementing the data flow shown in FIG. 2A, a system in accordance with embodiments disclosed herein may be used to manage operation of a data processing system in a manner that reduces a likelihood of the data processing system becoming compromised and/or operating in an undesired manner. Consequently, computer-implemented services provided using the data processing system may be provided as desired.

Turning to FIG. 2B, a second data flow diagram in accordance with an embodiment is shown. The second data flow diagram may illustrate data used in and data processing performed in obtaining a list of hardware components that are compliant with a security protocol and data model (SPDM) security standard (e.g., SPDM capable hardware components) and using the list of hardware components during a startup of a data processing system. FIG. 2B-2C may include an expansion of measurements collection process 204 shown in FIG. 2A.

To obtain the list of hardware components that are compliant with the SPDM security standard (list of SPDM capable devices 236), basic input/output system (BIOS) boot process 202 may be performed to facilitate booting of the data processing system. BIOS boot process 202 may be initiated by powering on the data processing system or resetting the system, and may include loading the BIOS program code by a hardware processor (e.g., via a serial peripheral interface (SPI) bus) of the data processing system. The BIOS may then manage operation of the data processing system until an operating system and/or other management entity of the data processing system is loaded. Refer to the description of FIG. 2A for additional details regarding BIOS boot process 202.

Once booted, the BIOS may perform tasks to manage startup of the data processing system, such as device detection process 240. During device detection process 240, the BIOS may identify devices (e.g., also referred to as hardware components) operably connected to the data processing system and obtain identifiers for the devices, such as globally unique identifiers (GUIDs) and/or other unique codes and/or numbers usable to identify the devices. The identifiers for any detected devices may be compiled into a list, table, and/or other organizational structure to obtain a list of detected devices.

As part of performing device detection process 240, the BIOS may determine whether any new hardware components have been added to the data processing system since last completed startup of the data processing system. To do so, the BIOS may compare the list of detected devices to existing lists of hardware components established by the data processing system prior to the startup of the data processing system (e.g., during previous startups of the data processing system) and stored as a part of devices data 112. The existing lists of hardware components may include information regarding various hardware components, such as previously determined SPDM capabilities. The existing lists of hardware components may include: (i) an existing list of hardware components that are compliant with the SPDM security standard, (ii) an existing list of hardware components that are not compliant with the SPDM security standard, and/or (iii) other lists and/or information regarding the devices. Refer to the description of FIG. 1 for additional details regarding devices data 112.

The list of detected devices may be compared to the existing lists of hardware components to determine whether any of the detected devices are new devices. For example, the BIOS may search the existing lists of hardware components using an identifier for a detected device as a key for the search.

If a first device in the list of detected devices is identified in the existing lists of hardware components (e.g., the first device is a remembered device), remembered device detected result 246 may be obtained. Remembered device detected result 246 may include: (i) an indication that the SPDM capabilities of the first device have been previously determined and stored as part of devices data 112 (e.g., during previous startups of the data processing system), (ii) an indication regarding whether the first device is compliant with the SPDM security standard, and/or (iii) other information regarding the first device.

If a second device in the list of detected devices is not identified in the existing lists of hardware components (e.g., the second device is a new device), new device detected result 244 may be obtained. New device detected result 244 may include: (i) an indication that the SPDM capabilities of the second device have not been previously determined and stored as part of devices data 112 (e.g., the second device has been added to the data processing system since last completed startup of the data processing system), (ii) an identifier and/or other characteristics of the second device, and/or (iii) other information regarding the second device.

If a new device is detected (e.g., new device detected result 244 is obtained for a device in the list of detected devices), SPDM capabilities detection process 228 may be performed (e.g., for the device indicated by new device detected result 244). During SPDM capabilities detection process 228, the BIOS (and/or other startup manager) may identify compliance of the new device with respect to the SPDM security standard by checking the firmware and/or system documentation of the new device to determine whether the new device supports the SPDM security standard. A dedicated tool and/or command may be used to query the new device for its specific SPDM capabilities, including supported cryptographic algorithms and/or certificate formats (e.g., via an SPDM message exchange with the new device to retrieve its identity certificate and/or associated details about its security features).

Following performance of SPDM capabilities detection process 228, a result may be obtained indicating whether the new device is compliant with the SPDM security standard. For example, SPDM capable result 232 may be obtained, which may include a data structure indicating that the new device is compliant with the SPDM security standard. In another example, not SPDM capable result 230 may be obtained, which may include a data structure indicating that the new device is not compliant with the SPDM security standard.

The result obtained from performing SPDM capabilities detection process 228 (e.g., not SPDM capable result 230 and/or SPDM capable result 232) may be used to perform devices data updating process 234. During devices data updating process 234, the existing lists of hardware components included as part of devices data 112 may be updated to include information regarding the new device. For example, if not SPDM capable result 230 is obtained (e.g., it is determined that the new device is not compliant with the SPDM security standard), the new device (e.g., an identifier for the new device) may be added to the existing list of hardware components that are not compliant with the SPDM security standard. In another example, if SPDM capable result 232 is obtained, the new device may be added to the existing list of hardware components that are compliant with the SPDM security standard. In doing so, devices data 112 may be updated to include information regarding the SPDM compliance of new devices and used during subsequent startups of the data processing system.

Using remembered device detected result 246 and/or SPDM capable result 232, list of SPDM capable devices 236 may be obtained. List of SPDM capable devices may include identifying information for any SPDM compatible devices identified by SPDM capable result 232 and identifying information for any SPDM capable devices included in remembered device detected result 246.

Turning to FIG. 2C, a third data flow diagram in accordance with an embodiment is shown. The third data flow diagram may illustrate data used in and data processing performed in obtaining device measurements from at least a portion of devices of a data processing system that are specified by a startup policy during a startup of a data processing system. FIGS. 2B-2C may include an expansion of measurements collection process 204 shown in FIG. 2A.

Prior to obtaining the device measurements, startup policy 238 and list of SPDM capable devices 236 may be obtained (e.g., by a startup manager). To obtain the device measurements (e.g., device measurements 252), device measurements collection process 250 may be performed using startup policy 238 and list of SPDM capable devices 236. Startup policy 238 may be similar to startup policy 119 described in FIG. 1. For example, startup policy 119 may indicate that: (i) a first portion of hardware components of the data processing system are to be used to evaluate a security posture of the data processing system during startup, and (ii) a second portion of the hardware components are not to be used to evaluate the security posture of the data processing system during the startup.

Evaluating the security posture of the data processing system may include: (i) obtaining first measurements from the first portion of the hardware components, (ii) checking integrity and/or authenticity of software and/or firmware hosted by the first portion of the hardware components using the first measurements and data structures trusted by a trusted platform module (TPM) of the data processing system.

List of SPDM capable devices 236 may include: (i) any remembered devices for which remembered device detected result 246 indicates SPDM security standard compliance, and/or (ii) any new devices for which SPDM capable result 232 indicates SPDM security standard compliance. List of SPDM capable devices 236 may exclude any new devices for which not SPDM capable result 230 was obtained.

Startup policy 238 may be compared to list of SPDM capable devices 236 to identify hardware components (e.g., devices) that are: (i) compliant with the SPDM security standard and (ii) listed in startup policy 238 as devices to be used to evaluate the security posture of the data processing system during startup.

For example, during device detection process 240 a first device and a second device may be detected by the BIOS as being operably connected to the data processing system. It may be determined (e.g., using devices data 112) that the first device is a remembered device included in an existing list of hardware components that are compliant with the SPDM security standard; thus, remembered device detected result 246 for the first device may indicate that the first device is SPDM compliant. It may be determined (e.g., using devices data 112) that the second device is a new device (e.g., new device detected result 244 may be obtained for the second device) and SPDM capabilities detection process 228 may be performed for the second device. The second device may be identified as SPDM compliant and SPDM capable result 232 may be obtained for the second device. Consequently, the first device and the second device may be included in list of SPDM capable devices 236. Refer to FIG. 2B for details regarding device detection process 240, devices data 112, remembered device detected result 246, new device detected result 244, SPDM capabilities detection process 228, and SPDM capable result 232.

However, startup policy 238 may indicate that the first device is included in the first portion of the hardware components and the second device is included in the second portion of the hardware components.

Therefore, during device measurements collection process 250, a measurement process may be performed (e.g., based on the SPDM security standard) for the first portion of the hardware components (e.g., hardware components that are SPDM capable and identified by startup policy 238 for security checks during startup). Performing the measurement process may include performing an SPDM message exchange with each hardware component of the first portion of the hardware components to obtain first measurements (e.g., device measurements 252). Device measurements 252 may include security data (e.g., hashes of software code hosted by the hardware components) usable to validate authenticity and/or integrity of software hosted by the devices. Refer to the description of FIG. 2A for additional details regarding obtaining device measurements based on the SPDM security standard.

A security posture of the data processing system may be evaluated based on device measurements 252 during the startup. The security posture may be evaluated by a security manager of the data processing system using a trusted platform module (TPM) (e.g., similar to TPM 120 shown in FIG. 1 and FIG. 2A) and/or using trusted data (e.g., reports generated by the TPM) in collaboration with the BIOS and/or other entity. Evaluating the security posture of the data processing system may include checking the integrity and/or authenticity of the software hosted by the hardware components of the first portion of the hardware components. To do so, device measurements 252 and data structures trusted by the TPM of the data processing system may be used. For example, device measurements 252 may include hashes of software code hosted by the hardware components, which may be used to verify the authenticity and/or integrity of the hardware components by comparing the hashes to trusted (e.g., known good) hashes. The trusted data structures may be stored in the TPM and/or may be obtained by the TPM from trusted data sources. Refer to the description of FIG. 1 and FIG. 2A for additional details regarding the TPM.

Once the security posture of the data processing system is established, the operation of the data processing system may be managed based on the security posture to reduce a likelihood of the data processing system being compromised. For example, if the security posture of the data processing system indicates a hardware component may be compromised, the TPM may limit use of secrets (e.g., public/private keys, etc.) by the data processing system. In doing so, the secrets managed by the TPM may have a reduced risk of being accessed by unauthorized entities and/or a risk of other undesired impacts may be reduced.

Thus, by implementing the data flows shown in FIGS. 2A-2C, a system in accordance with embodiments disclosed herein may be used to improve startup speed of a data processing system while maintaining a desired level of security. By doing so, a resource cost (e.g., computational resources, time resources) of performing the startup may be reduced. Consequently, resources may be allocated to providing computer-implemented services and a likelihood that the computer-implemented services may be provided as desired may be increased.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Figure 3A:
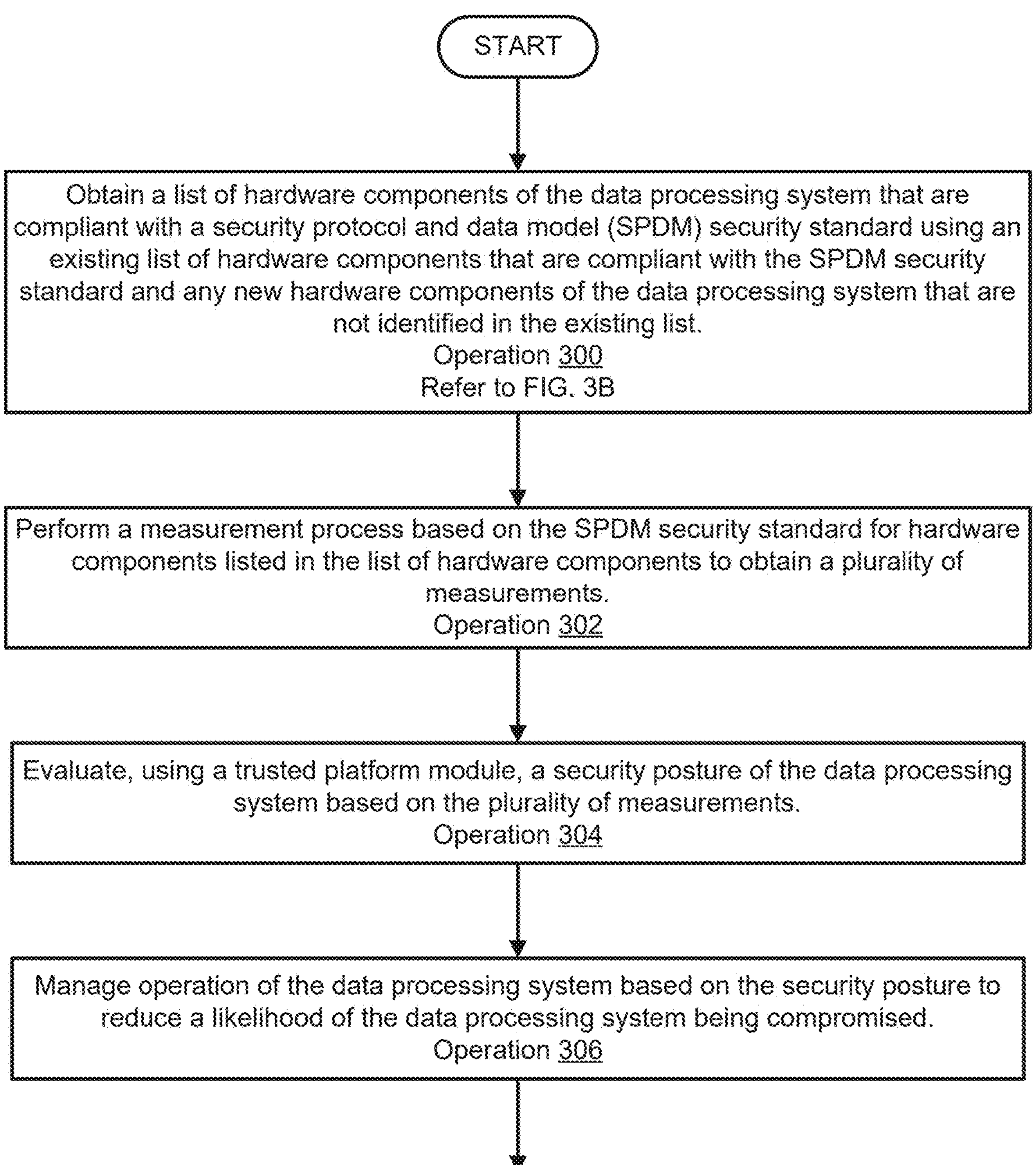
Figure 3B:
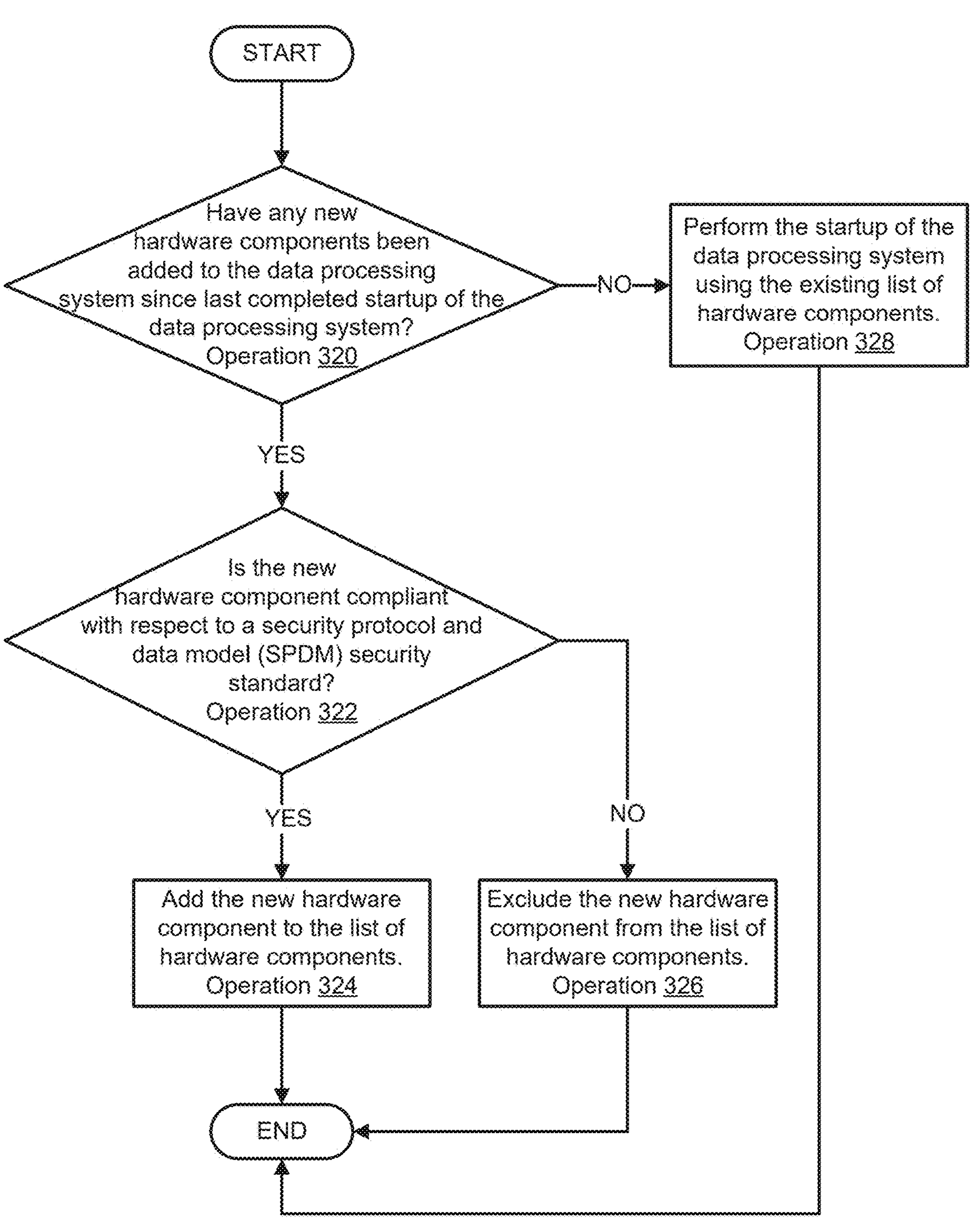

As discussed above, the components of FIGS. 1-2C may perform various methods to manage data used to provide computer-implemented services. FIGS. 3A-3C illustrate a method that may be performed by the components of the system of FIGS. 1-2C. In the diagrams discussed below and shown in FIGS. 3A-3C, any of the operations may be repeated, performed in different orders, and/or performed in parallel with or in a partially overlapping in time manner with other operations.

Turning to FIG. 3A, a first flow diagram illustrating a method for managing operation of a data processing system in accordance with an embodiment is shown. The method may be performed, for example, by any of the components of the system of FIG. 1, and/or any other entity without departing from embodiments disclosed herein. The method may be performed during a startup of the data processing system.

At operation 300, a list of hardware components of the data processing system that are compliant with a security protocol and data model (SPDM) security standard may be obtained using an existing list of hardware components that are compliant with the SPDM security standard and any new hardware components of the data processing system that are not identified in the existing list. Obtaining the list of hardware components may include: (i) making a determination regarding whether any new hardware components have been added to the data processing system since last completed startup of the data processing system using the existing list of hardware components, (ii) in a first instance of the determination where a new hardware component has been added: identifying compliance of the new hardware component with respect to the SPDM security standard, (iii) in a first instance of the identifying where the new hardware component is compliant: adding the new hardware component to the list of hardware components, (iv) in a second instance of the identifying where the new hardware component is not compliant: excluding the new hardware component from the list of hardware components, and/or (v) other methods. Refer to the description of FIG. 3B for additional details regarding obtaining the list of hardware components.

At operation 302, a measurement process may be performed based on the SPDM security standard for hardware components listed in the list of hardware components to obtain a plurality of measurements. Performing the measurement process may include: (i) performing an SPDM message exchange (e.g., initiated by the startup management entity of the data processing system such as the BIOS) with the hardware components listed in the list of hardware components that are compliant with the SPDM security standard to obtain the plurality of measurements, (ii) requesting the plurality of measurements from another entity (e.g., an intermediate entity) and receiving the plurality of measurements in response, (iii) reading the plurality of measurements from storage, and/or (iv) other methods.

At operation 304, a security posture of the data processing system may be evaluated using a trusted platform module (TPM) based on the plurality of measurements. Evaluating the security posture may include: (i) checking integrity and/or authenticity of software hosted by the hardware components listed in the list of hardware components using the plurality of measurements and data structures trusted by the TPM, (ii) establishing the security posture based on a result of checking the integrity and/or authenticity of the software, and/or (iii) other methods.

Checking the integrity and/or authenticity of the software hosted by the hardware components may include: (i) obtaining trusted data structures (e.g., stored in the TPM, from data sources trusted by the TPM such as a UEFI signature database), (ii) verifying the plurality of measurements by comparing the plurality of measurements to the trusted data structures, (iii) providing the plurality of measurements to another entity (e.g., a remote entity such as a server) and receiving a response indicating whether the plurality of measurements are verified, and/or (iv) other methods.

For example, the plurality of measurements may include a hash value of a portion of software hosted by a hardware component generated using a predetermined hash function. Verifying the plurality of measurements may include comparing the hash value to a known good hash value trusted by the TPM (e.g., a trusted data structure) in order to obtain a difference. The difference may be zero (e.g., when the hash values match) or nonzero (e.g., when the hash values do not match). If the difference is zero, for example, then the result may indicate that the portion of the software is verified as trustworthy. Otherwise, if the difference is nonzero, then the result may indicate that the portion of the software is not verified as trustworthy.

Establishing the security posture based on the result may include: (i) computing the security posture (e.g., by the TPM) using a security program such as a signature verification algorithm, (ii) determining the security posture based on the result and a policy and/or other type of rule set for establishing security postures, (iii) providing the result to another entity (e.g., a remote entity such as a server) and receiving a response indicating the security posture of the data processing system, and/or (iv) other methods.

At operation 306, operation of the data processing system may be managed based on the security posture to reduce a likelihood of the data processing system being compromised. Managing operation of the data processing system may include: (i) allowing, by the TPM, booting to proceed (e.g., presuming that the measurements indicate an acceptable security posture), (ii) limiting, by the TPM, use of secrets by the data processing system based on the security posture of the data processing system, (iii) performing other remedial actions should the security posture not meet certain requirements, and/or (iv) other methods.

Limiting use of secrets by the data processing system may include: (i) providing the operating system and/or other management entity of the data processing system restricted access to the secrets (e.g., based on a policy keyed to the security posture of the data processing system as evaluated by the TPM), (ii) denying a request (e.g., from the operating system) to access at least a portion of the secrets, and/or (iii) other methods.

The method may end following operation 306.

Turning to FIG. 3B, a second flow diagram illustrating a method for managing operation of a data processing system in accordance with an embodiment is shown. The method may be performed, for example, by any of the components of the system of FIG. 1, and/or any other entity without departing from embodiments disclosed herein. FIG. 3B may be an expansion of operation 300 shown in FIG. 3A.

At operation 320, it may be determined whether any new hardware components have been added to the data processing system since last completed startup of the data processing system using an existing list of hardware components. Determining whether any new hardware components have been added may include: (i) detecting (e.g., by a startup manager of the data processing system such as the BIOS) operable connection of hardware components to the data processing system to obtain a list of detected hardware components (e.g., including identifiers for each hardware component such as GUIDs), (ii) comparing the list of detected hardware components to the existing list of hardware components to identify whether any of the hardware components in the list of detected hardware components are new hardware components (e.g., the new hardware components may include hardware components in the list of detected hardware components that are not included in the list of existing hardware components), (iii) providing the list of detected hardware components to another entity and receiving an indication of whether any of the detected hardware components are new hardware components in response, and/or (iv) other methods.

Comparing the list of detected hardware components to the existing list of hardware components may include: (i) obtaining the existing list of hardware components (e.g., reading the existing list of hardware components from storage, receiving the existing list of hardware components from another entity), (ii) searching the existing list of hardware components for the hardware components in the list of detected hardware components using identifiers for the hardware components as a key for the search, (iii) making a determination, based on a result of the search, regarding whether any hardware components in the list of detected hardware components are not included in the existing list of hardware components, and/or (iv) other methods.

If it is determined that a new hardware component has been added (e.g., the determination is "Yes" at operation 320), then the method may proceed to operation 322.

At operation 322, it may be identified whether the new hardware component is compliant with respect to a security protocol and data model (SPDM) security standard (e.g., the new hardware component has SPDM capabilities). Identifying whether the new hardware component is compliant with respect to the SPDM security standard may include: (i) checking the firmware and/or system documentation of the new hardware component to determine whether the new hardware component supports the SPDM security standard (e.g., querying the new hardware component for its specific SPDM capabilities via an SPDM message exchange with the new hardware component), (ii) performing a search in a list, table, and/or other data structure including hardware components that are compliant with the SPDM security standard using an identifier for the new hardware component as a key for the search, (iii) receiving a message from another entity indicating whether the new hardware component is compliant with the SPDM security standard, and/or (iv) other methods.

If it is determined that the new hardware component is compliant with respect to the SDPM security standard (e.g., the determination is "Yes" at operation 322), then the method may proceed to operation 324.

At operation 324, the new hardware component may be added to the list of hardware components. Adding the new hardware component to the list of hardware components may include: (i) updating the list of hardware components to include the new hardware component (e.g., to include an entry including an identifier for the new hardware component and/or an indication that the new hardware component is compliant with the SPDM security standard), (ii) providing instructions to another entity indicating the new hardware component is to be added to the list of hardware components, and/or (iii) other methods.

The method may end following operation 324.

Returning to operation 320, if it is determined that a new hardware component has not been added (e.g., the determination is "No" at operation 320), then the method may proceed to operation 328.

At operation 328, the startup of the data processing system may be performed using the existing list of hardware components (e.g., that are compliant with the SPDM security standard). Performing the startup using the existing list of hardware components may include: (i) obtaining the existing list of hardware components (e.g., reading the existing list of hardware components from storage, receiving the existing list of hardware components from another entity), (ii) using the existing list of hardware components to determine whether each hardware component in the list of detected hardware components is compliant with the SPDM security standard (e.g., performing a search in the existing list of hardware components using an identifier for each hardware component as a key for the search), (iii) performing a measurement process based on the SPDM security standard for the hardware components included in the existing list of hardware components to obtain a plurality of measurements (refer to the description of operation 302 in FIG. 3A for additional details regarding performing the measurement process), (iv) evaluating, using a TPM, a security posture of the data processing system based on the plurality of measurements (refer to the description of operation 304 in FIG. 3A for additional details regarding evaluating the security posture), (v) managing operation of the data processing system based on the security posture (refer to the description of operation 306 in FIG. 3A for additional details regarding managing operation of the data processing system), and/or (vi) other methods.

The method may end following operation 328.

Returning to operation 322, if it is determined that the new hardware component is not compliant with respect to the SDPM security standard (e.g., the determination is "No" at operation 322), then the method may proceed to operation 326.

At operation 326, the new hardware component may be excluded from the list of hardware components (e.g., that are compliant with the SPDM security standard). Excluding the new hardware component from the list of hardware components may include: (i) not adding the new hardware component to the list of hardware components, (ii) adding the new hardware component to a list of hardware components that are not compliant with the SPDM security standard (e.g., an existing list of hardware components that are not compliant with the SPDM security standard), (iii) providing instructions to another entity indicating the new hardware component is not to be added to the list of hardware components and/or the new hardware is to be added to the list of hardware components that are not compliant with the SPDM security standard, and/or (iv) other methods.

The method may end following operation 326.

Turning to FIG. 3C, a third flow diagram illustrating a method for managing operation of a data processing system in accordance with an embodiment is shown. The method may be performed, for example, by any of the components of the system of FIG. 1, and/or any other entity without departing from embodiments disclosed herein. The method may be performed during a startup of the data processing system.

At operation 330, a startup policy may be obtained for a data processing system. The startup policy may indicate that: (i) a first portion of hardware components of the data processing system is to be used to evaluate a security posture of the data processing system during the startup, and (ii) a second portion of the hardware components is not to be used to evaluate the security posture of the data processing system during the startup. Obtaining the startup policy may include: (i) reading the startup policy from storage (e.g., secure storage, general storage), (ii) receiving the startup policy from a trusted entity (e.g., a remote server, another data processing system) via a message over a communication system, (iii) generating the startup policy based on feedback from a user (e.g., an SME), and/or (iv) other methods.

At operation 332, a first measurement process may be performed based on the startup policy and the SPDM security standard for the first portion of the hardware components to obtain first measurements. Prior to performing the first measurement process, a list of SPDM capable devices of the data processing system may be obtained and compared to the first portion of the hardware components included in the startup policy. Obtaining the list of SPDM capable devices may include: (i) reading the list of SPDM capable devices from storage, (ii) receiving the list of SPDM capable devices from another entity via a message over a communication system, (iii) generating the list of SPDM capable devices (e.g., refer to operation 300 in FIG. 3A), and/or (iv) other methods. If any hardware components of the first portion of the hardware components are not identified as SPDM compliant by the list of SPDM compliant devices, an action set may be performed (e.g., the hardware components may be flagged for exclusion in the first measurement process, an SME may be notified).

Performing the first measurement process may include: (i) performing an SPDM message exchange (e.g., initiated by the startup management entity of the data processing system such as the BIOS) with the first portion of the hardware components to obtain the first measurements, (ii) requesting the first measurements from another entity (e.g., an intermediate entity) and receiving the first measurements in response, (iii) reading the first measurements from storage, and/or (iv) other methods.

At operation 334, a security posture of the data processing system may be evaluated using a trusted platform module (TPM) based on the first measurements and not using measurements of any of the second portion of the hardware components. Evaluating the security posture may include: (i) checking integrity and/or authenticity of software hosted by the hardware components of the first portion of the hardware components using the first measurements and data structures trusted by the TPM, (ii) establishing the security posture based on a result of checking the integrity and/or authenticity of the software, and/or (iii) other methods.

Checking the integrity and/or authenticity of the software hosted by the hardware components and establishing the security posture of the data processing system may include methods similar to those described in operation 304 of FIG. 3A.

At operation 336, operation of the data processing system may be managed based on the security posture to reduce a likelihood of the data processing system being compromised. Managing operation of the data processing system may include methods similar to those described in operation 306 of FIG. 3A.

The method may end following operation 336.

After the startup of the data processing system, a second measurement process may be performed, based on the SPDM standard, for the second portion of the hardware components to obtain second measurements. The second measurement process may be performed for some or all of the hardware components of the second portion of the hardware components (e.g., as specified by the startup policy and/or another policy). The second measurement process may be performed by an operating system agent and/or another entity responsible for performing security checks in the post-boot environment.

Performing the second measurement process may include methods similar to those described with respect to the first measurement process at operation 332. For example, performing the second measurement process may include performing an SPDM message exchange (e.g., initiated by operation manager and/or other operating system agent for the data processing system) with one or more hardware components of the second portion of the hardware components to obtain the second measurements.

The security posture of the data processing system may be updated based on the second measurements to obtain an updated security posture for the data processing system. Updating the security posture may include: (i) checking integrity and/or authenticity of software hosted by the one or more hardware components of the second portion of the hardware components using the second measurements and data structures trusted by the TPM (refer to operation 304 of FIG. 3A) and/or data structures trusted by a remote server (e.g., the second measurements may be provided to a remote server for the integrity check process, refer to server devices verification process 220 in FIG. 2A), (ii) modifying the security posture based on a result of checking the integrity and/or authenticity of the software hosted by the one or more hardware components of the second portion of the hardware components (e.g., a second result), and/or (iii) other methods.

Modifying the security posture may include: (i) computing the updated security posture using a security program such as a signature verification algorithm, (ii) determining the updated security posture based on the security posture, the second result, and a policy and/or other type of rule set for establishing security postures, (iii) providing the second result to another entity (e.g., a remote entity such as a server) and receiving a response indicating the updated security posture of the data processing system, and/or (iv) other methods.

The operation of the data processing system may be managed based on the updated security posture to reduce the likelihood of the data processing system being compromised. Managing the operation of the data processing system may include methods similar to those described with respect to operation 306 in FIG. 3A.

Thus, as illustrated above, embodiments disclosed herein may provide systems and methods may facilitate startups of a data processing system in a manner that improves startup speed. By using a startup policy, each hardware component that is SPDM compatible may electively not be validated during a startup for the data processing system. In doing so, the security of the data processing system may be maintained while reducing resource consumption during the startup.

Figure 4:
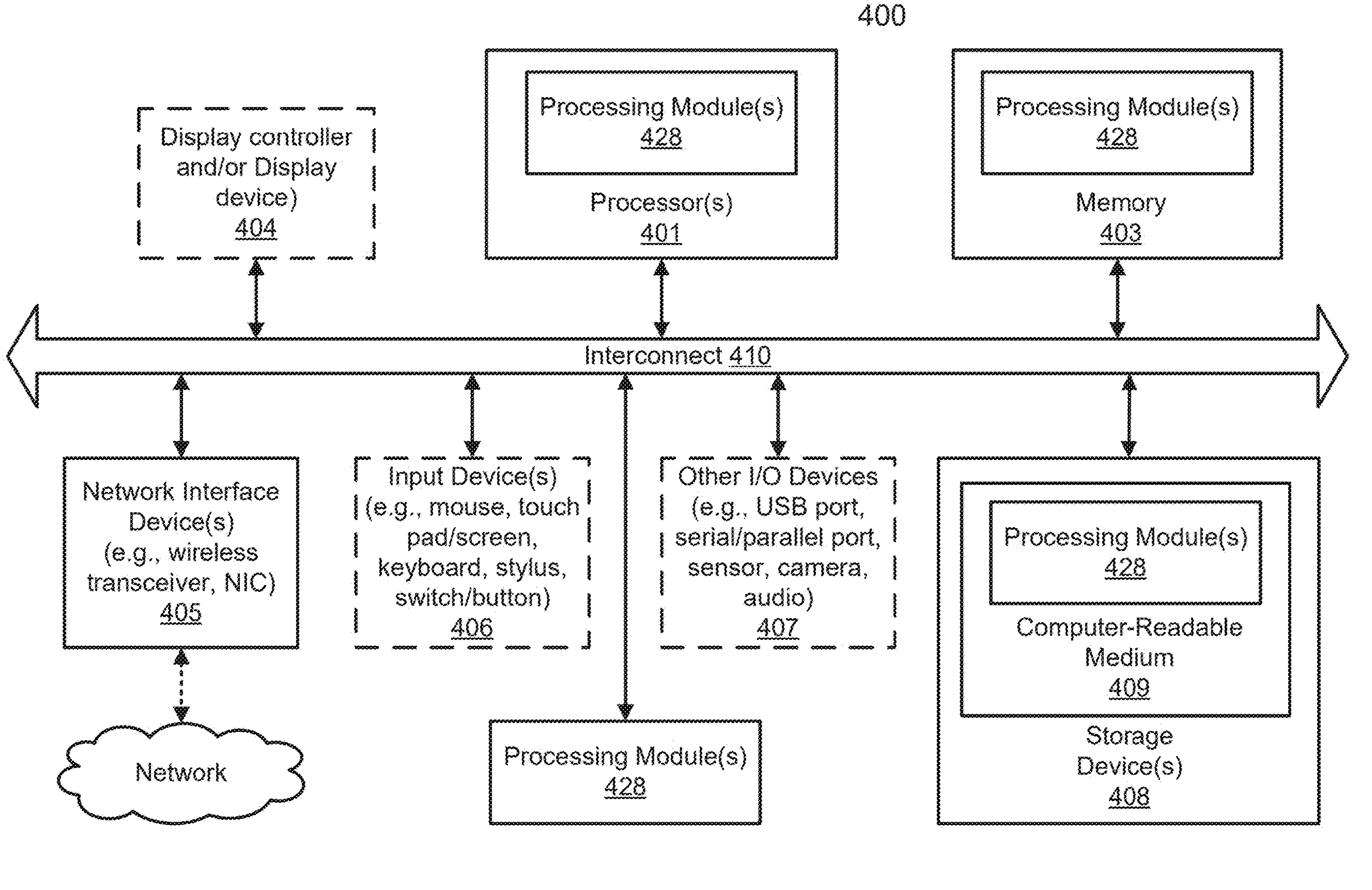
FIG. 4 shows a block diagram illustrating a data processing system in accordance with an embodiment.

Any of the components illustrated in FIGS. 1-3C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term “machine” or “system” shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux® Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a data processing system, the method comprising:

during a startup of the data processing system:

obtaining a startup policy for the data processing system, the startup policy indicating that:

a first portion of hardware components of the data processing system is to be used to evaluate a security posture of the data processing system during the startup, and a second portion of the hardware components is not to be used to evaluate the security posture of the data processing system during the startup;

performing, based on the startup policy and a security protocol and data model (SPDM) security standard, a first measurement process for the first portion of hardware components to obtain first measurements;

evaluating, using a trusted platform module (TPM), the security posture of the data processing system based on the first measurements and not using measurements of any of the second portion of the hardware components; and managing operation of the data processing system based on the security posture to reduce a likelihood of the data processing system being compromised.

2. The method of claim 1, further comprising:

after the startup of the data processing system:

performing a second measurement process, based on the SPDM security standard, for the second portion of the hardware components to obtain second measurements;

updating the security posture of the data processing system based on the second measurements to obtain an updated security posture for the data processing system; and managing the operation of the data processing system based on the updated security posture to reduce the likelihood of the data processing system being compromised.

3. The method of claim 1, wherein hardware components of the first portion of the hardware components and hardware components of the second portion of the hardware components are compliant with the SPDM security standard.

4. The method of claim 1, wherein second measurements are available to be obtained from the second portion of the hardware components at a time that the first measurement process is performed.

5. The method of claim 1, wherein members of the first portion of the hardware components and members of the second portion of the hardware components are chosen based on levels of risk to security of the data processing system corresponding to potential compromise of each of the hardware components of the data processing system.

6. The method of claim 5, wherein the members of the first portion of the hardware components pose a greater risk to the security of the data processing system if compromised than the members of the second portion of the hardware components.

7. The method of claim 1, wherein members of the first portion of the hardware components and members of the second portion of the hardware components are chosen based on likelihoods that changes have been made to each of the hardware components of the data processing system since a previous startup of the data processing system occurred.

8. The method of claim 1, wherein the startup policy and a list of hardware components of the data processing system that are compliant with a security protocol and data model (SPDM) security standard are obtained by a startup manager of the data processing system prior to performing the first measurement process.

9. The method of claim 8, wherein the startup manager is a basic input-output system (BIOS).

10. The method of claim 8, wherein the startup manager is hosted by a hardware processor of the data processing system, and the trusted platform module is a hardware component that is distinguishable from the hardware processor.

11. The method of claim 1, wherein the first measurements comprise first security data usable to validate authenticity and/or integrity of software hosted by the first portion of the hardware components.

12. The method of claim 1, wherein the SPDM security standard is a data model for hardware components of data processing systems, the SPDM security standard specifying, at least, methods of security communication between the hardware components, minimum standards of data to be made available to other hardware components, and security information to be made available to the other hardware components.

13. The method of claim 1, wherein managing operation of the data processing system comprises:

limiting, by the TPM, use of secrets by the data processing system based on the security posture of the data processing system.

14. The method of claim 1, wherein evaluating the security posture of the data processing system comprises:

checking integrity and/or authenticity of software hosted by the first portion of the hardware components using the first measurements and data structures trusted by the TPM.

15. A non-transitory machine-readable medium having instructions stored therein, which when executed by a processor, cause the processor to perform operations for managing operation of a data processing system, the operations comprising:

during a startup of the data processing system:

obtaining a startup policy for the data processing system, the startup policy indicating that:

a first portion of hardware components of the data processing system is to be used to evaluate a security posture of the data processing system during the startup, and a second portion of the hardware components is not to be used to evaluate the security posture of the data processing system during the startup;

performing, based on the startup policy and a security protocol and data model (SPDM) security standard, a first measurement process for the first portion of hardware components to obtain first measurements;

evaluating, using a trusted platform module (TPM), the security posture of the data processing system based on the first measurements and not using measurements of any of the second portion of the hardware components; and managing operation of the data processing system based on the security posture to reduce a likelihood of the data processing system being compromised.

16. The non-transitory machine-readable medium of claim 15, wherein the operations further comprise:

after the startup of the data processing system:

performing a second measurement process, based on the SPDM security standard, for the second portion of the hardware components to obtain second measurements;

updating the security posture of the data processing system based on the second measurements to obtain an updated security posture for the data processing system; and managing the operation of the data processing system based on the updated security posture to reduce the likelihood of the data processing system being compromised.

17. The non-transitory machine-readable medium of claim 15, wherein hardware components of the first portion of the hardware components and hardware components of the second portion of the hardware components are compliant with the SPDM security standard.

18. A data processing system, comprising:

a processor; and a memory coupled to the processor to store instructions, which when executed by the processor, cause the processor to perform operations for managing operation of a data processing system, the operations comprising:

during a startup of the data processing system:

obtaining a startup policy for the data processing system, the startup policy indicating that:

a first portion of hardware components of the data processing system is to be used to evaluate a security posture of the data processing system during the startup, and a second portion of the hardware components is not to be used to evaluate the security posture of the data processing system during the startup;

performing, based on the startup policy and a security protocol and data model (SPDM) security standard, a first measurement process for the first portion of hardware components to obtain first measurements;

evaluating, using a trusted platform module (TPM), the security posture of the data processing system based on the first measurements and not using measurements of any of the second portion of the hardware components; and managing operation of the data processing system based on the security posture to reduce a likelihood of the data processing system being compromised.

19. The data processing system of claim 18, wherein the operations further comprise:

after the startup of the data processing system:

performing a second measurement process, based on the SPDM security standard, for the second portion of the hardware components to obtain second measurements;

updating the security posture of the data processing system based on the second measurements to obtain an updated security posture for the data processing system; and managing the operation of the data processing system based on the updated security posture to reduce the likelihood of the data processing system being compromised.

20. The data processing system of claim 18, wherein hardware components of the first portion of the hardware components and hardware components of the second portion of the hardware components are compliant with the SPDM security standard.

* * * * *